(No Model.)
G. LEWIS & C. E. POINTON.
MACHINE FOR MOLDING DOUGH.
No. 571,775. Patented Nov. 24, 1896.
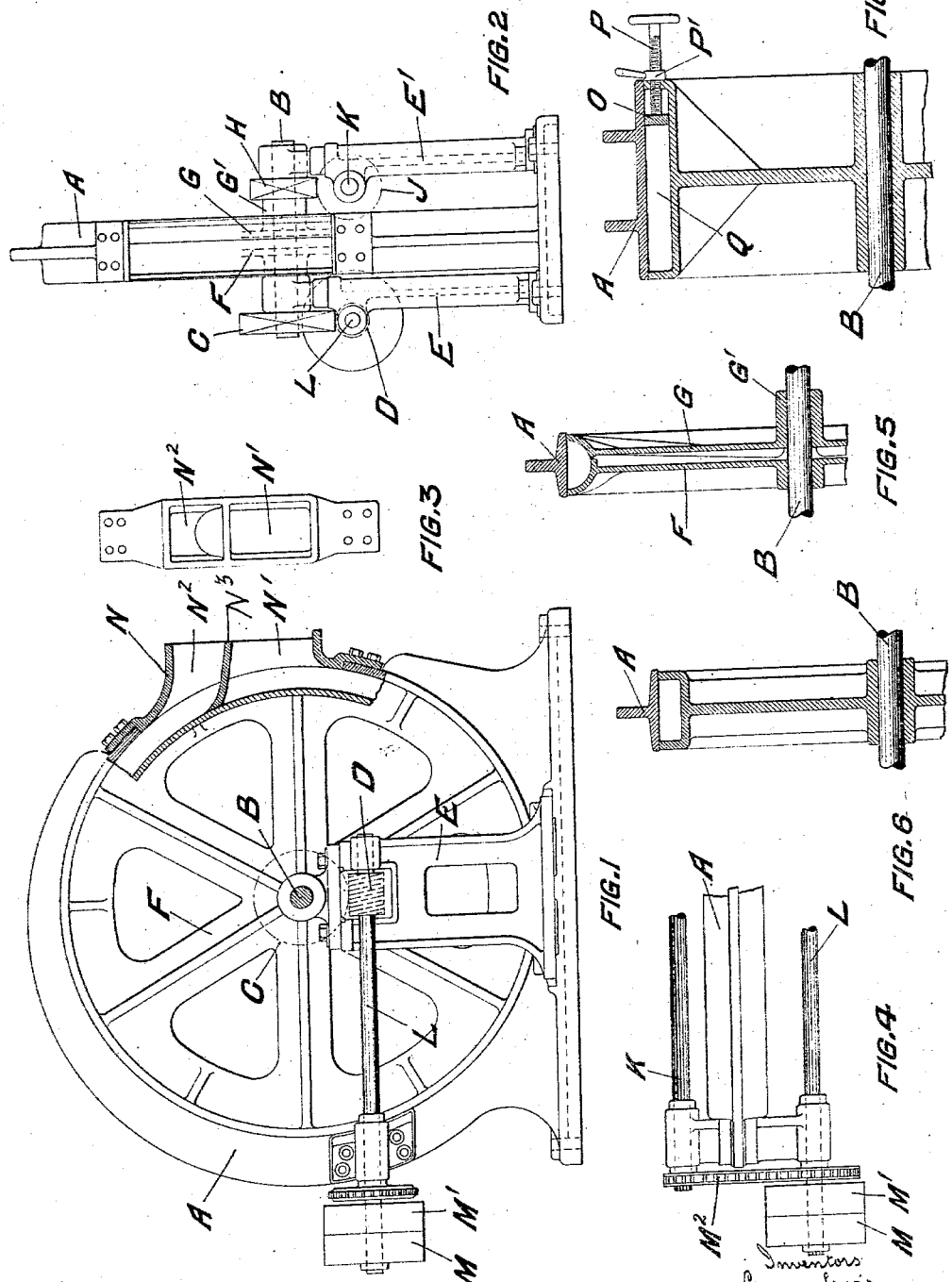
Witnesses
H. van Degimmel
E. A. Scott
Inventors
George Lewis
Charles Edward Pointon
By Richards
Attorneys

UNITED STATES PATENT OFFICE.

GEORGE LEWIS AND CHARLES EDWARD POINTON, OF WELLINGTON, NEW ZEALAND.

MACHINE FOR MOLDING DOUGH.

SPECIFICATION forming part of Letters Patent No. 571,775, dated November 24, 1896.

Application filed May 15, 1896. Serial No. 591,700. (No model.) Patented in England October 10, 1894, No. 19,950, and in Germany April 8, 1895, No. 84,427.

*To all whom it may concern:*

Be it known that we, GEORGE LEWIS, residing at Park Street, Wellington, and CHARLES EDWARD POINTON, residing at Wrekin Road, Wellington, in the county of Salop, New Zealand, citizens of Great Britain, have invented certain new and useful Improvements in Machines for Molding Dough, (for which we have obtained a patent in Great Britain, No. 19,950, bearing date October 10, 1894, and in Germany, No. 84,427, dated April 8, 1895,) of which the following is a specification.

This invention relates to improvements in machines for molding dough into balls or other shapes for the purpose of forming loaves, rolls, and like articles.

In the accompanying sheet of explanatory drawings, to be hereinafter referred to, Figure 1 is a side elevation with part section representing one form of our improved machine. Fig. 2 is an end elevation of the machine with the mouthpiece removed. Fig. 3 is an end elevation of the mouthpiece. Fig. 4 is a plan showing the driving-gear. Fig. 5 is a part section through the rotating disks or molding-wheels. Fig. 6 is a similar view representing a modified form of molding-wheel. Fig. 7 is a part section showing a molding-wheel suitable for long loaves or rolls and having an adjustable ring.

The same reference-letters in the different views indicate the same parts.

In carrying our invention into effect we construct a fixed cylinder or drum A, having a central rotating shaft B, driven by worm-wheel C and worm D or by bevel-wheels or other suitable gear. The shaft is supported by the standards E E', bolted or secured to the base of the machine. On this shaft B we secure the forming-disk or molding-wheel F and loosely mount upon the same another disk or wheel G. Upon the extended boss G' of the wheel G we key or secure the worm-wheel H, which is driven by the worm J. The worm J is mounted upon the shaft K, which receives its motion from the driving-shaft L, carrying the worm D. The driving-shaft L is provided with fast and loose belt-pulleys M M' for transmitting power from a line of shafting or direct from an engine, although we sometimes revolve the shaft by means of a hand-wheel or crank-lever. The motion of the driving-shaft L is transmitted to the shaft K preferably by chain-wheels and chain M². We form the peripheries of the disks or molding-wheels to the configuration shown at Fig. 5. An annular space or chamber is thus formed between the interior circumference of the cylinder A and the semicircular periphery formed by the combined disks.

Upon one side or end of the cylinder or drum A we fix the double mouthpiece N, having a lower aperture N' for the admission of the lump of dough to be molded, and an upper aperture N² for the discharge of the same after it has been carried around the interior of the drum or cylinder. These mouths N' and N² are separated by a division-plate N³ in the mouthpiece N.

The disks or molding-wheels F and G are driven or revolved in opposite directions preferably by making the worms and worm-wheels right and left handed, and by variation in the dimensions of the gearing the disk or wheel G is caused to revolve at a greater rate than the wheel F. The rotation of the disks causes the lumps of dough to be rolled round and round against the interior of the cylinder, and they are thus formed into balls or spherical shapes. On reaching the aperture N² the dough balls are discharged from the machine ready for placing together to form the loaf, cake, or other required shape. The disks or molding-wheels may also be arranged to move in the same direction, and one disk may be fixed and remain stationary while the other is caused to revolve.

Instead of employing two disks or molding-wheels F and G driven in opposite directions, as hereinbefore described, we sometimes employ but one disk or molding-wheel having side flanges, as shown at Fig. 6.

We sometimes arrange the cylinder, as shown at Fig. 7, with a long rectangular space formed between the cylinder and the single disk or molding-wheel, and provide a ring O to fit within the space, which can be adjusted to different positions by screws, as P, and locked in position by lock-nuts P'. The space Q is thus made suitable for long loaves or rolls. Any length of loaf may thus be made within the limits of adjustment of the ring O.

Having now described our invention, what we claim as new, and desire to secure by Letters Patent, is—

1. The improvements in dough-molding machines comprising a pair of molding-wheels mounted within a fixed cylinder upon one common shaft, and provided with gearing by which they are revolved in opposite directions, and at different speeds, the peripheries of the molding-wheels being so shaped as to form an annular space or chamber between the disks and the internal surface of the cylinder, substantially as set forth.

2. In dough-molding machines, the combination of the molding-wheel F keyed or fixed to the shaft B, having a large gearing-wheel C upon one end of the same, and the molding-wheel G mounted loosely upon the shaft B, and having a small gearing-wheel H keyed or fixed to its extended boss G', with a fixed cylinder or drum A having a double mouthpiece N attached thereto, substantially as set forth.

3. In dough-molding machines the combination comprising the fixed cylinder A, the molding-wheels F and G, and worm-wheels C and H, with the worms D and J mounted upon the shafts L and K respectively, the belt-pulleys M M' and chain-gearing M², the worms D and J and the worm-wheels C and H being made right and left handed respectively, substantially as set forth.

4. In a dough-molding machine, a stationary cylinder, a molding-wheel within the same, a mouthpiece projecting from said cylinder at one side, and a division-plate therein forming an inlet and outlet passage in said mouthpiece, substantially as described.

5. In a dough-molding machine, a cylinder and a pair of molding-wheels having their peripheries shaped to form an annular space between the wheels and cylinder, the said wheels operating side by side in opposite directions and the said cylinder extending about the adjacent peripheries of the said wheels substantially as described.

In witness whereof we have hereunto set our hands in presence of two witnesses.

GEORGE LEWIS.
CHARLES EDWARD POINTON.

Witnesses:
HERBERT BOWKETT.
THOMAS J. BAYLISS.

It is hereby certified that the residence of the patentee in Letters Patent No. 571,775, granted November 24, 1896, upon the application of George Lewis and Charles Edward Pointon, for an improvement in "Machines for Molding Dough," was erroneously written and printed "Wellington, New Zealand," whereas said residence should have been written and printed *Wellington, England*; and that the said Letters Patent should be read with this correction therein that the same may conform to the record of the case in the Patent Office.

Signed, countersigned, and sealed this 19th day of January, A. D., 1897.

[SEAL.]

JNO. M. REYNOLDS,
*Assistant Secretary of the Interior.*

Countersigned:
JOHN S. SEYMOUR,
*Commissioner of Patents.*